C. D. McCLINTOCK.
POWER TRANSMISSION MECHANISM.
APPLICATION FILED JAN. 15, 1912.
1,041,132.
Patented Oct. 15, 1912.
2 SHEETS—SHEET 1.
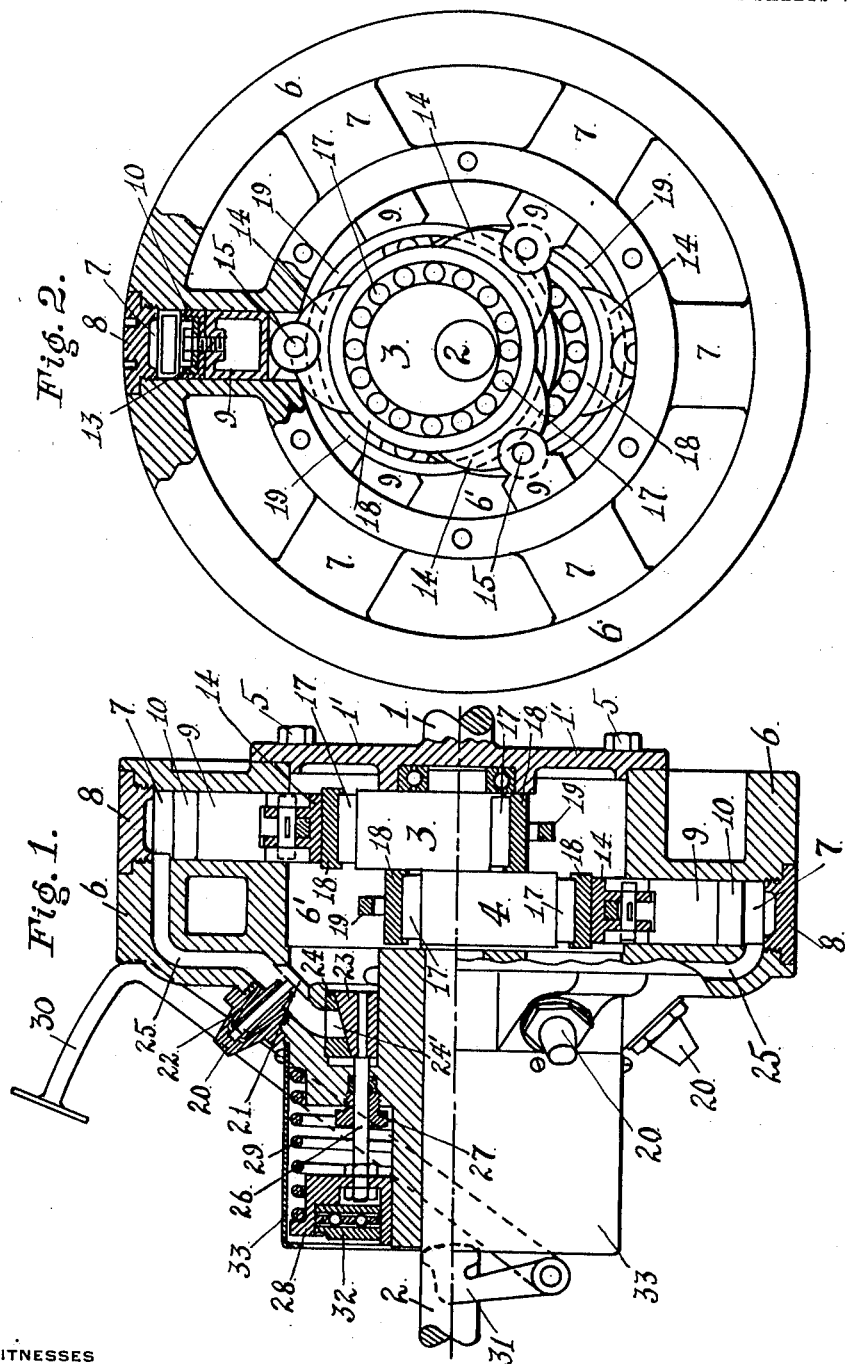
WITNESSES
INVENTOR
Charles David McClintock
by Wm. F. Booth
his Attorney

UNITED STATES PATENT OFFICE.

CHARLES DAVID McCLINTOCK, OF OAKLAND, CALIFORNIA, ASSIGNOR OF FIFTY-EIGHT ONE-HUNDREDTHS TO SAUL CORNFIELD, OF OAKLAND, CALIFORNIA.

POWER-TRANSMISSION MECHANISM.

1,041,132.  Specification of Letters Patent.  Patented Oct. 15, 1912.

Application filed January 15, 1912. Serial No. 671,205.

*To all whom it may concern:*

Be it known that I, CHARLES DAVID MC-CLINTOCK, a citizen of the United States, residing at Oakland, in the county of Alameda and State of California, have invented certain new and useful Improvements in Power-Transmission Mechanism, of which the following is a specification.

My invention relates to that class of power-transmitting mechanism in which a controllable difference in rotative speed is provided for; and, particularly, to that subclass in which a controllable fluid resistance device is interposed between a driving and a driven shaft.

My present invention concerns that type of speed-changing fluid-controlled devices in which a plurality of cylinders and their pistons are disposed radially from the center line of the shafts in such manner that their housing or frame is made to serve the purpose of a balance wheel for the engine or motor; and it consists in the novel constructions, arrangements and combinations of parts which I shall hereinafter fully describe, and by which I am enabled to provide an efficient speed changer, sufficiently compact and strong and free from liability to wear or breakage to adapt it for use on automobiles or other motor driven vehicles, and for other special appliances or machines in which it is essential that power be transmitted gradually and with certainty.

Figure 4:
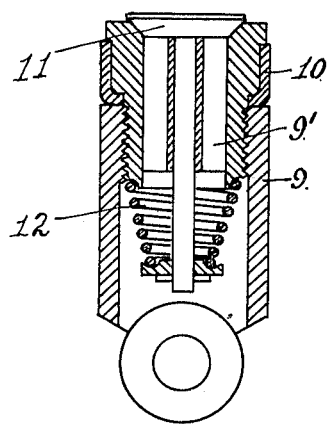
Figure 5:
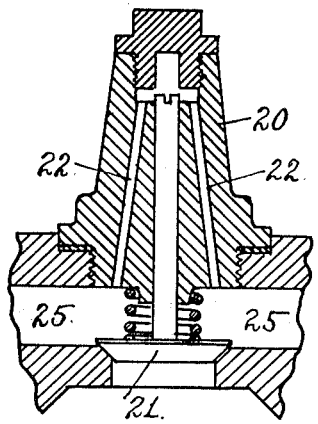
Figure 3:
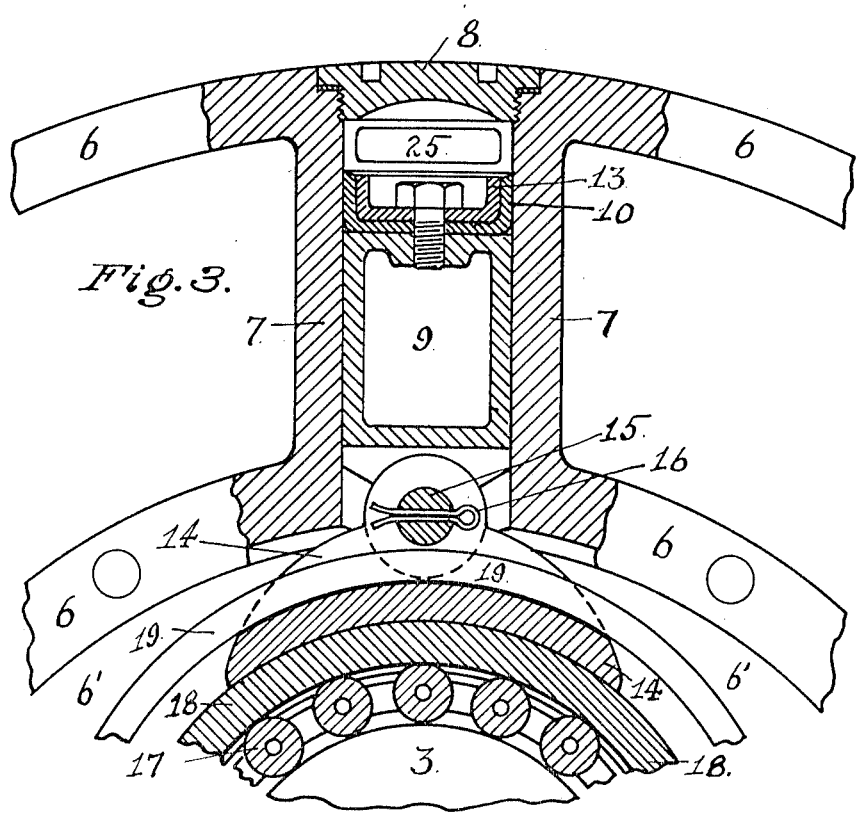

In the accompanying drawings to which reference is made—Figure 1 is a broken, sectional view of my device, on the line of the shafts. Fig. 2 is a broken, sectional view of the front or driving side of the device, the driving shaft being omitted. Fig. 3 is an enlarged sectional view of a portion of my device showing in detail one of the pistons, one of the cams and the intervening connections. Fig. 4 is an enlarged view showing the construction when the piston is made with a through passage controlled by the inlet valve. Fig. 5 is an enlarged view showing the construction of the inlet valve, when the piston is not provided with a passage and the valves are disposed as in Fig. 1.

1, in Fig. 1, is the driving shaft with its flange 1'; and 2 is the driven shaft with its integral cams 3 and 4. These shafts are alined, but are connected only through the fluid resistance device to be described.

Fixed to the driving shaft 1, in suitable manner, as, for example, to its flange 1' by the bolts 5, is the housing or frame 6 of the pumps, which, by its form and weight, constitutes the necessary balance wheel for the motor or engine. In this housing or frame 6 are made cylinders or piston chambers 7, in any suitable number; I have here indicated six. They are radially disposed, and each is fitted with a cap 8. In each cylinder is a piston 9, packed as usual at 10. This piston 9 may be formed, as is shown in Fig. 4, with a passage 9' through it from end to end, the outer end of this passage having an outwardly opening inlet valve 11 held to its seat by a spring 12. But when the inlet valve is differently disposed, as in Fig. 1, then the form of piston 9 is as is shown in Figs. 2 and 3, namely, a closed one and is provided with a cup like retainer 13 for the packing 10, as is better shown in Fig. 3. In the housing 6 is formed a central chamber or well 6' with which the piston chambers communicate and into which the pistons extend. These pistons have shoes 14, pivotally connected to them by means of the pin 15 which is held in place by the spring clip 16. (See Fig. 3.)

Fast upon, preferably integral with the driven shaft 2 are the cams 3 and 4 relatively oppositely disposed and each one operating, in its plane of rotation, three of the six pumps shown in Fig. 2. These pumps are so arranged that they alternate in their order of placement. Around the cams 3 and 4 are the anti-friction rollers 17. Between these rollers and the piston shoes 14 is a free bearing-ring 18, which also serves as a retainer or cage for the rollers 17. This free bearing-ring 18 by reason of the interposition of the rollers 17, is not caused to slide on or turn in the shoes 14 but performs its function by stepping or rolling from one shoe to the other as the parts rotate. A pull ring 19 is fitted in a slot on the outer side of the piston shoes 14 and holds them in contact and alinement with the free bearing-ring 18. This pull ring 19 also serves to positively draw each piston in turn toward the center of the machine, which action causes the pump chambers to fill with the fluid, to be afterward forced out through the controlling valve 23.

20 is the inlet valve cage shown in Fig. 1, and more clearly in Fig. 5.

21 is the inlet valve and 22 is the relief vent.

23, in Fig. 1, is the controlling valve, and 24 is its seat through which ports 24' are made communicative with each pump chamber by means of the passage 25. This valve seat 24 is a hardened and ground ring pressed into a recess in the housing or frame 6. Its inner face is beveled to fit the beveled face of the controlling valve 23, and it is by the pressure exerted by the pistons through the fluid resistance on the bevel face of the controlling valve 23 that said valve is forced out automatically. The controlling valve 23 which is necessarily a circular ring is made to fit on its outer face to the inner face of the seat 24 and also to slide freely on the inner projection of the hub of the housing 6. The valve stems 26, of which there are two directly opposite to each other, pass through the stuffing box 27 and fasten by means of suitable adjusting nuts to the guide ring or sleeve 28 which in turn acts against the loading spring 29 when the foot pedal 30 is depressed or when the pressure in the cylinders 7 and passages 25 forces the valve 23 open. The motion of the foot pedal 30 is transmitted through the short lever 31 to the thrust bearing 32 and thence to the guide ring or sleeve 28, as above stated.

33, in Fig. 1, is a light metal shield or guard.

From the foregoing description of the machine, its operation should be clearly understood. I will, however, point out that the housing 6 is fastened to the driving shaft and rotates with it as a balance wheel, while the inner working parts are all attached flexibly to the driven shaft 2. The only connection between these two composite members being the fluid resistance between them. It will be seen that if the controlling valve 23 is closed, all parts of the machine will revolve as a unit and no pumping action will take place in the cylinders; therefore, the machine will deliver the power received by it from the engine at engine speed and without loss. If the foot pedal is depressed so as to open the controlling valve, or the pressures cause it to open automatically there will take place a retarding action in the driven shaft which carries the load, which action will cause the pistons to reciprocate in their cylinders, forcing out the fluid and drawing it in alternately in proportion to the ratio of speeds of the two composite members of the machine. As before stated, this action may be caused to take place at the will of the operator or will occur automatically at the proper time and under the conditions requiring the vehicle to slow down.

It will be noted that owing to the form in which my device is built no pressure is needed in the central space or well 6' to force the fluid into the pump cylinders, that action being very effectually accomplished by centrifugal force. Therefore, if the fluid should become heated by long continued action it will find space in which to expand, since it is not necessary to fill the machine entirely full with the working fluid, to insure its positive action. Oil appears to be the most satisfactory working fluid as it will furnish perfect lubrication to all parts of the machine.

A feature of my invention to which I call particular attention is the balanced controlling valve 23, which, with its loading spring 29 constitutes an automatic speed regulator. This automatic action takes place when the torque on the driven shaft (due to the load imposed) causes a rise in pressure in the pump chambers in excess of that for which the loading spring has been set. This means, in effect, that a constant torque will be maintained at all times when the engine or motor is working at its full capacity, and the measure of this torque will be determined by the setting of the loading spring which will be so adjusted as to require the engine or motor to work at its full capacity before the automatic action takes place. Thus, if my invention is applied to an automobile, the load imposed on the engine or motor (when climbing a hill or encountering bad roads or heavy head winds) will be limited to the maximum allowable torque for which the loading spring has been set, with the result that the car or vehicle will be caused to slow down in its speed of travel, automatically and in the exact and correct ratio to the amount of power delivered to it through the medium of my device. Means are also provided, by the foot pedal 30 by which the speed of the car or vehicle can be deliberately retarded or allowed to stop altogether when such foot pedal is fully depressed, thereby freely passing the fluid through the controlling valve 23. By the same means, that is, when this foot pedal is released, the free discharge of the fluid is interrupted and finally stopped altogether, when the device is again brought to the condition of an automatic machine. It will be seen from the foregoing that my device really constitutes a balance wheel for the engine or motor, a clutch and an automatic power transmitting mechanism, all in one compact adaptable form. I also call attention to the peculiar arrangement of the inner working parts of my device by means of which I secure, not only the static and dynamic balance of the machine, but also a balance of the forces acting through the fluid resistance against the controlling valve, whereby it is caused to "float," so to speak, between two opposite and equal forces at all times and in every possible position which it may assume.

Having thus described my invention what I claim as new and desire to secure by Letters Patent is:—

1. In power-transmitting mechanism, in combination with a driving shaft and a driven shaft; a housing fixed to one of said shafts and provided with a central fluid space and a plurality of piston-chambers opening into said space and radiating therefrom with the axes of the shafts as a center; a piston in each chamber; a passage leading from the outer end of each chamber back into the central fluid space of the housing; a balanced valve for controlling the flow of the fluid from said passages into the central space, said valve being automatically operative under and in proportion to the pressure of the fluid in the passages; other valves for admitting the fluid from the central space into the piston-chambers; and a rotatively movable connection between the other shaft and the pistons to operate said pistons.

2. In power-transmitting mechanism, in combination with a driving shaft and a driven shaft; a housing fixed to one of said shafts and provided with a central fluid space and a plurality of piston-chambers opening into said space and radiating therefrom with the axes of the shafts as a center; a piston in each chamber; a passage leading from the outer end of each chamber back into the central fluid space of the housing; a balanced valve for controlling the flow of the fluid from said passages into the central space, said valve being automatically operative under and in proportion to the pressure of the fluid in the passages; a spring affecting said valve and adapting it to be set to any desired load; other valves for admitting the fluid from the central space into the piston-chambers; and a rotatively movable connection between the other shaft and the pistons to operate said pistons.

3. In power-transmitting mechanism, in combination with a driving shaft and a driven shaft; a housing fixed to one of said shafts and provided with a central fluid space and a plurality of piston-chambers opening into said space and radiating therefrom with the axes of the shafts as a center; a piston in each chamber; a passage leading from the outer end of each chamber, an annular beveled walled valve seat having ports with which said passages communicate, said valve seat opening into the central space of the housing; an annular valve having a beveled surface mounted in the beveled valve seat and slidable axially therein, said valve being automatically operative under and in proportion to the pressure of the fluid upon its beveled surface; other valves for admitting the fluid from the central space into the piston-chambers; and a rotatively movable connection between the other shaft and the pistons to operate said pistons.

4. In power-transmitting mechanism, in combination with a driving shaft and a driven shaft; a housing fixed to one of said shafts and provided with a central fluid space and a plurality of piston-chambers opening into said space and radiating therefrom with the axes of the shafts as a center; a piston in each chamber; a passage leading from the outer end of each chamber, an annular beveled walled valve seat having ports with which said passages communicate, said valve seat opening into the central space of the housing; an annular valve having a beveled surface mounted in the beveled valve seat and slidable axially therein, said valve being automatically operative under and in proportion to the pressure of the fluid upon its beveled surface; a spring affecting said valve and adapting it to be set to any desired load; other valves for admitting the fluid from the central space into the piston-chambers; and a rotatively movable connection between the other shaft and the pistons to operate said pistons.

5. In power-transmitting mechanism, in combination with a driving shaft and a driven shaft; a housing fixed to one of said shafts and provided with a central fluid space and a plurality of piston-chambers opening into said space and radiating therefrom with the axes of the shafts as a center; a piston in each chamber; a passage leading from the outer end of each piston chamber back into the central fluid space of the housing; a valve for controlling the passage of the fluid through said passages; other valves for admitting the fluid from the central space into the piston chambers; and a rotatively movable connection between the other shaft and the pistons whereby said pistons are operated, consisting of a cam on said other shaft, by which the pistons are forced outwardly and a pull ring by which said pistons are drawn inwardly.

6. In power-transmitting mechanism, in combination with a driving shaft and a driven shaft; a housing fixed to one of said shafts and provided with a central fluid space and a plurality of piston-chambers opening into said space and radiating therefrom with the axes of the shafts as a center; a piston in each chamber; a passage leading from the outer end of each piston-chamber back into the central fluid space of the housing; a valve for controlling the passage of the fluid through said passages; other valves for admitting the fluid from the central space into the piston-chambers; and a rotatively movable connection between the other shaft and the pistons whereby said pistons are operated, consisting of a cam on said other shaft, a free bearing-ring encircling the cam with interposed anti-friction bearings, said bearing ring acting to force the pistons outwardly, and means for drawing the pistons inwardly.

7. In power-transmitting mechanism, in combination with a driving shaft and a driven shaft; a housing fixed to one of said shafts and provided with a central fluid space and a plurality of piston-chambers opening into said space and radiating therefrom with the axes of the shafts as a center; a piston in each chamber; a passage leading from the outer end of each piston chamber back into the central fluid space of the housing; a valve for controlling the passage of the fluid through said passages; other valves for admitting the fluid from the central space into the piston-chambers; and a rotatively movable connection between the other shaft and the pistons whereby said pistons are operated, consisting of a cam on said other shaft, a free bearing ring encircling the cam with interposed anti-friction bearings, shoes pivoted to the inner ends of the pistons and impinging on the free-bearing-ring whereby the pistons are forced outwardly, and means for drawing the pistons inwardly.

8. In power-transmitting mechanism, in combination with a driving shaft and a driven shaft; a housing fixed to one of said shafts and provided with a central fluid space and a plurality of piston-chambers opening into said space and radiating therefrom with the axes of the shafts as a center; a piston in each chamber; a passage leading from the outer end of each piston-chamber back into the central fluid space of the housing; a valve for controlling the passage of the fluid through said passages; other valves for admitting the fluid from the central space into the piston-chambers; and a rotatively movable connection between the other shaft and the pistons whereby said pistons are operated, consisting of a cam on said other shaft, a free bearing-ring encircling the cam with interposed anti-friction bearings, said bearing-ring acting to force the pistons outwardly and a free pull ring to draw the pistons inwardly.

9. In power-transmitting mechanism, in combination with a driving shaft and a driven shaft; a housing fixed to one of said shafts and provided with a central fluid space and a plurality of piston-chambers opening into said space and radiating therefrom with the axes of the shafts as a center; a piston in each chamber; a passage leading from the outer end of each piston-chamber back into the central fluid space of the housing; a valve for controlling the passage of the fluid through said passages; other valves for admitting the fluid from the central space into the piston-chambers; and a rotatively movable connection between the other shaft and the pistons whereby said pistons are operated, consisting of a cam on said other shaft, a free bearing-ring encircling the cam with interposed anti-friction bearings, shoes connected to the inner ends of the pistons by pivot pins, said shoes impinging on the free bearing ring, whereby the pistons are forced outwardly, and a free pull ring acting on the shoes to draw the pistons inwardly.

10. In power-transmitting mechanism, in combination with a driving shaft and a driven shaft; a housing fixed to one of said shafts and provided with a central fluid space and a plurality of piston-chambers opening into said space and radiating therefrom with the axes of the shafts as a center, said piston-chambers being alternately disposed in two annular parallel series; a piston in each chamber; a passage leading from the outer end of each piston chamber back into the central fluid space of the housing; a valve for controlling the passage of the fluid through said passages; other valves for admitting the fluid from the central space into the piston-chambers; and a rotatively movable connection between the other shaft and the pistons whereby said pistons are operated, consisting of a pair of oppositely disposed cams on the other shaft, one cam for the pistons of each piston-chamber series; means interposed between the cams and the pistons for forcing the pistons outward, and other means for drawing the pistons inwardly.

In testimony whereof I have signed my name to this specification in the presence of two subscribing witnesses.

CHARLES DAVID McCLINTOCK.

Witnesses:
WM. F. BOOTH,
D. B. RICHARDS.